(12) United States Patent
VerKuilen et al.

(10) Patent No.: US 7,320,216 B2
(45) Date of Patent: Jan. 22, 2008

(54) HYDRAULIC SYSTEM HAVING PRESSURE COMPENSATED BYPASS

(75) Inventors: Michael T. VerKuilen, Metamora, IL (US); Aleksandar M. Egelja, Naperville, IL (US)

(73) Assignees: Caterpillar Inc., Peoria, IL (US); Shin Caterpillar Mitsubishi Ltd (JP)

( * ) Notice: Subject to any disclaimer, the term of this patent is extended or adjusted under 35 U.S.C. 154(b) by 141 days.

(21) Appl. No.: 11/261,539

(22) Filed: Oct. 31, 2005

(65) Prior Publication Data

US 2007/0095059 A1 May 3, 2007

(51) Int. Cl.
*F16D 31/02* (2006.01)
(52) U.S. Cl. .......................... 60/421; 91/361
(58) Field of Classification Search ................. 60/421, 60/428, 429, 436, 468; 91/361, 459
See application file for complete search history.

(56) References Cited

U.S. PATENT DOCUMENTS

| | | | |
|---|---|---|---|
| 3,366,202 A | 1/1968 | James | |
| 4,046,270 A | 9/1977 | Baron et al. | |
| 4,222,409 A | 9/1980 | Budzich | |
| 4,250,794 A | 2/1981 | Haak et al. | |
| 4,416,187 A | 11/1983 | Nystrom | |
| 4,437,385 A | 3/1984 | Kramer et al. | |
| 4,480,527 A | 11/1984 | Lonnemo | |
| 4,581,893 A | 4/1986 | Lindbom | |
| 4,586,330 A | 5/1986 | Watanabe et al. | |
| 4,623,118 A | 11/1986 | Kumar | |
| 4,662,601 A | 5/1987 | Andersson | |
| 4,706,932 A | 11/1987 | Yoshida et al. | |
| 4,747,335 A | 5/1988 | Budzich | |
| 4,799,420 A | 1/1989 | Budzich | |
| 5,079,919 A | 1/1992 | Nakamura et al. | |
| 5,137,254 A | 8/1992 | Aardema et al. | |
| 5,152,142 A | 10/1992 | Budzich | |
| 5,211,196 A | 5/1993 | Schwelm | |
| 5,212,950 A | 5/1993 | Shirai et al. | |
| 5,277,027 A | 1/1994 | Aoyagi et al. | |
| 5,287,794 A | 2/1994 | Andersson | |
| 5,297,381 A | 3/1994 | Eich et al. | |
| 5,313,873 A | 5/1994 | Gall et al. | |
| 5,350,152 A | 9/1994 | Hutchison et al. | |

(Continued)

FOREIGN PATENT DOCUMENTS

EP   1 536 071 A1   6/2005

(Continued)

*Primary Examiner*—Igor Kershteyn
(74) *Attorney, Agent, or Firm*—Finnegan, Henderson, Farabow, Garrett & Dunner (57) ABSTRACT

The present disclosure is directed to a hydraulic system. The system includes a first source of pressurized fluid and at least one fluid actuator. The system also includes a first valve disposed between the first source and the at least one fluid actuator being configured to selectively communicate pressurized fluid from the first source to a source of low pressure. The system further includes a controller configured to determine a first amount of displacement of the first valve, determine a second amount of displacement of the first valve, and modify the first amount of displacement as a function of the second amount of displacement when a first pressure is less than or equal to a pressure of pressurized fluid acting on the at least one fluid actuator.

21 Claims, 3 Drawing Sheets

U.S. PATENT DOCUMENTS

| | | | |
|---|---|---|---|
| 5,366,202 A | 11/1994 | Lunzman | |
| 5,447,093 A | 9/1995 | Budzich | |
| 5,477,677 A | 12/1995 | Krnavek | |
| 5,537,818 A | 7/1996 | Hosseini et al. | |
| 5,540,049 A | 7/1996 | Lunzman | |
| 5,553,452 A | 9/1996 | Snow et al. | |
| 5,568,759 A | 10/1996 | Aardema | |
| 5,678,470 A | 10/1997 | Koehler et al. | |
| 5,701,933 A | 12/1997 | Lunzman | |
| 5,784,945 A * | 7/1998 | Krone et al. | 91/361 |
| 5,813,226 A | 9/1998 | Krone | |
| 5,813,309 A | 9/1998 | Taka et al. | |
| 5,857,330 A | 1/1999 | Ishizaki et al. | |
| 5,868,059 A | 2/1999 | Smith | |
| 5,873,244 A | 2/1999 | Cobo et al. | |
| 5,878,647 A | 3/1999 | Wilke et al. | |
| 5,890,362 A | 4/1999 | Wilke | |
| 5,946,910 A * | 9/1999 | Hayashi et al. | 60/421 |
| 5,947,140 A | 9/1999 | Aardema et al. | |
| 5,960,695 A | 10/1999 | Aardema et al. | |
| 5,974,796 A | 11/1999 | Ishikawa et al. | |
| 6,009,708 A | 1/2000 | Miki et al. | |
| 6,026,730 A | 2/2000 | Yoshida et al. | |
| 6,082,106 A | 7/2000 | Hamamoto | |
| 6,216,456 B1 | 4/2001 | Mitchell | |
| 6,275,757 B1 | 8/2001 | Watanabe et al. | |
| 6,367,365 B1 | 4/2002 | Weichert et al. | |
| 6,467,264 B1 | 10/2002 | Stephenson et al. | |
| 6,502,393 B1 | 1/2003 | Stephenson et al. | |
| 6,502,500 B2 | 1/2003 | Yoshino | |
| 6,516,614 B1 | 2/2003 | Knoll | |
| 6,598,391 B2 | 7/2003 | Lunzman et al. | |
| 6,619,183 B2 | 9/2003 | Yoshino | |
| 6,655,136 B2 | 12/2003 | Holt et al. | |
| 6,662,705 B2 | 12/2003 | Huang et al. | |
| 6,691,603 B2 | 2/2004 | Linerode et al. | |
| 6,694,860 B2 | 2/2004 | Yoshino | |
| 6,715,402 B2 | 4/2004 | Pfaff et al. | |
| 6,718,759 B1 | 4/2004 | Tabor | |
| 6,725,131 B2 | 4/2004 | Lunzman | |
| 6,732,512 B2 | 5/2004 | Pfaff et al. | |
| 6,748,738 B2 | 6/2004 | Smith | |
| 6,761,029 B2 | 7/2004 | Linerode | |
| 6,874,319 B2 | 4/2005 | Nakatani | |
| 6,880,332 B2 * | 4/2005 | Pfaff et al. | 60/422 |
| 2003/0121256 A1 | 7/2003 | Mather | |
| 2003/0121409 A1 | 7/2003 | Lunzman et al. | |
| 2003/0125840 A1 | 7/2003 | Lunzman et al. | |
| 2003/0196545 A1 | 10/2003 | Jensen et al. | |
| 2004/0055288 A1 | 3/2004 | Pfaff et al. | |
| 2004/0055289 A1 | 3/2004 | Pfaff et al. | |
| 2004/0055452 A1 | 3/2004 | Tabor | |
| 2004/0055453 A1 | 3/2004 | Tabor | |
| 2004/0055454 A1 | 3/2004 | Pfaff et al. | |
| 2004/0055455 A1 | 3/2004 | Tabor et al. | |

FOREIGN PATENT DOCUMENTS

| | | |
|---|---|---|
| JP | 02613041 B2 | 5/1997 |
| JP | 10306677 | 11/1998 |

* cited by examiner

HYDRAULIC SYSTEM HAVING PRESSURE COMPENSATED BYPASS

TECHNICAL FIELD

The present disclosure is directed to a hydraulic system and, more particularly, to a hydraulic system having pressure compensated bypass.

BACKGROUND

Work machines such as, for example, excavators, dozers, loaders, motor graders, and other types of heavy machinery typically use one or more hydraulic actuators to accomplish a variety of tasks. The actuators are fluidly connected to one or more pumps that provide pressurized fluid to chambers within the actuators. An electro-hydraulic valve arrangement is typically connected between the pumps and the actuators to control a flow rate and direction of pressurized fluid to and from the chambers of the actuators.

The electro-hydraulic valve arrangements often include either single-valve or multi-valve arrangements. Single-valve arrangements typically include a valve having only two positions with fixed flow areas to direct flow into and out of the chambers. Single-valve arrangements may also include a bypass orifice, which directs fluid flow from the pump to a reservoir to provide a desired feedback to an operator.

Operator feedback may occur, for example, during a resistive movement of the actuator, when the load on the actuator increases, e.g., when a work implement transitions from soft soil to hard soil. A resistive movement of the actuator increases the pressure within the hydraulic system which causes an increase in fluid flow through the bypass orifice to the reservoir. As such, an operator may sense a slower movement of the actuator and/or a machine component, may sense the need to further actuate a control lever to move an associated component, may sense a change in engine speed, and/or may sense a variety of other operational changes. Such a feedback provided to an operator may be indicative of the load acting on the actuator. Additionally, the bypass orifice acts to limit the pressure within the hydraulic system by relieving pressure increases within the hydraulic system to the reservoir. As such, a particular bypass orifice will limit the pressure available to move the actuator.

Multi-valve arrangements provide increased flexibility over single-valve arrangements by allowing independent control of fluid into and out of each chamber of an actuator. Multi-valve arrangements may not, however, include bypass orifices and thus may adversely affect feedback to an operator and/or may not provide hydraulic system pressure limits during work machine operation.

U.S. Pat. No. 5,540,049 ("the '049 patent") issued to Lunzman discloses a control system and method for a hydraulic actuator. The '049 patent includes a hydraulic system having a variable flow hydraulic pump delivering fluid under pressure to the hydraulic actuator. The '049 patent also includes a closed center valve that operates to control a flow of the hydraulic fluid to the hydraulic actuator and a separate bypass valve that operates to control a flow of the hydraulic fluid to a fluid reservoir. The '049 patent also includes a control system having a pump controller and a separate bypass controller. The separate bypass controller calculates the effect of the closed center valve stroke signal and derives a signal based on either a pressure modulation or velocity modulation mode to control the position of the separate bypass valve. The separate bypass controller also communicates a signal to the pump controller which controls the output of the pump based on the communicated signal and a pump pressure signal.

Although the '049 patent may include a separate bypass valve to control the flow of pressurized fluid to a reservoir, it may control the output of the pump to achieve the desired output pressure as a function of the desired modulation pressure determined by the bypass controller. Also, during multi-function operations in a pressure modulation mode, the '049 patent may control the output of the pump by summing the multiple modulation pressures to establish a combined modulation pressure, establishing a high pressure limit for the hydraulic system. The '049 patent may also require a complex pump and valve control system to control the pump output.

The present disclosure is directed to overcoming one or more of the problems set forth above.

SUMMARY OF THE INVENTION

In a first aspect, the present disclosure is directed to a hydraulic system. The system includes a first source of pressurized fluid and at least one fluid actuator. The system also includes a first valve disposed between the first source and the at least one fluid actuator configured to selectively communicate pressurized fluid from the first source to a source of low pressure. he system further includes a controller configured to determine a first amount of displacement of the first valve, determine a second amount of displacement of the first valve, and modify the first amount of displacement as a function of the second amount of displacement when a first pressure is less than or equal to a pressure of pressurized fluid acting on the at least one fluid actuator.

In another aspect, the present disclosure is directed to a method of operating a hydraulic system. The method includes pressurizing a fluid and directing pressurized fluid toward a first valve. The first valve has a first flow passageway and a first valve stem. The method also includes establishing a first flow area of the first flow passageway and increasing the first flow area when a determined pressure is less than a pressure of pressurized fluid acting on a fluid actuator.

DETAILED DESCRIPTION

Figure 1:
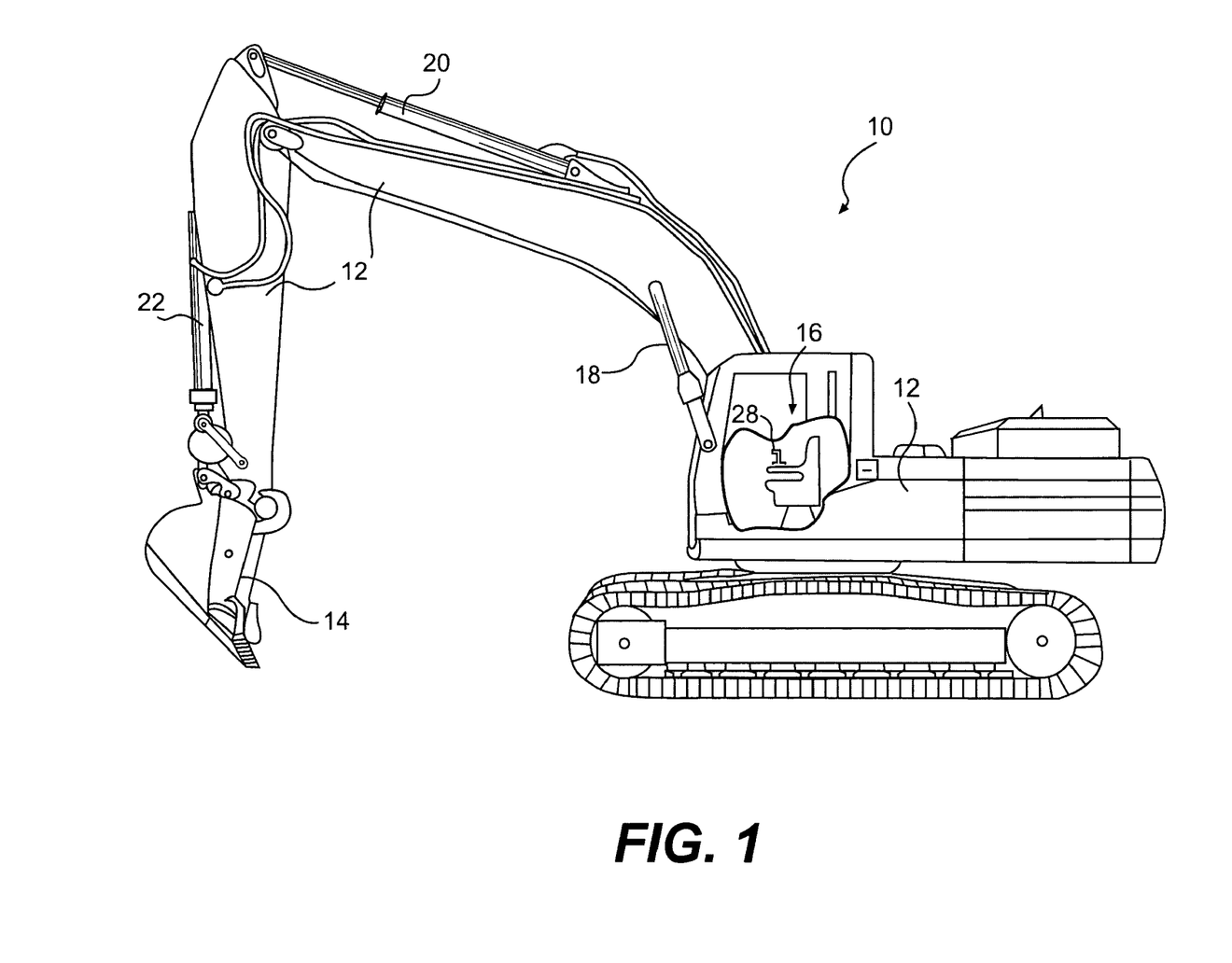
FIG. 1 is a side view diagrammatic illustration of an exemplary disclosed work machine.

FIG. 1 illustrates an exemplary work machine 10. Work machine 10 may be a fixed or mobile machine that performs some type of operation associated with an industry such as, for example, mining, construction, farming, or any other industry known in the art. For example, work machine 10 may be an earth moving machine such as an excavator, a backhoe, a loader, a dozer, a motor grader, or any other earth moving machine. Work machine 10 may include a frame 12, a work implement 14, hydraulic actuators 18, 20, 22, and an operator interface 16. It is contemplated that work machine 10 may include additional components, such as, for example, a traction device (not referenced), a power source (not shown), and/or any other components known in the art.

Frame 12 may include any structural unit that supports work machine 10. Frame 12 may be, for example, a stationary base frame connecting a power source to a traction device, a movable frame member of a linkage system connecting work implement 14 to the traction device and the power source, or any other type of frame known in the art.

Work implement 14 may include any device used in the performance of a task and may be controllable by operator interface 16. For example, work implement 14 may include a blade, a bucket, a shovel, a ripper, a propelling device, and/or any other task-performing device known in the art. Work implement 14 may be connected to frame 12 via a direct pivot, via a linkage system with hydraulic actuators 18, 20, 22 forming one or more members in the linkage system, or in any other appropriate manner. Work implement 14 may be configured to pivot, rotate, slide, swing, and/or move relative to frame 12 in any other manner known in the art.

Operator interface 16 may be configured to receive input from an operator indicative of a desired operation, such as, for example, movement of work implement 14, movement of the traction device, movement of frame 12, and/or any other suitable operation of work machine 10. Specifically, operator interface 16 may include one or more operator interface devices 28 that may include proportional-type controllers configured to position and/or orient components of work machine 10, such as, for example, a multi-axis joystick located to one side of an operator station. It is contemplated that additional and/or different operator interface devices 28 may be included within operator interface 16 such as, for example, wheels, knobs, push-pull devices, switches, pedals, and/or other operator interface devices known in the art.

Hydraulic actuators 18, 20, 22 may each include a piston-cylinder arrangement, a hydraulic motor, and/or any other known hydraulic actuator having one or more fluid chambers therein. For example, hydraulic actuators 18, 20, 22 may each include a tube defining a cylinder and a piston separating the cylinder into a first chamber and a second chamber. Pressurized fluid may be selectively supplied to the first and second chambers to create a pressure differential across the piston affecting movement of the piston relative to the tube, as is conventional in the art. The resulting expansion and retraction of each of hydraulic actuators 18, 20, 22 may function to assist in moving, for example, frame 12 and/or work implement 14. It is contemplated that work machine 10 may include any number of hydraulic actuators.

Figure 2:
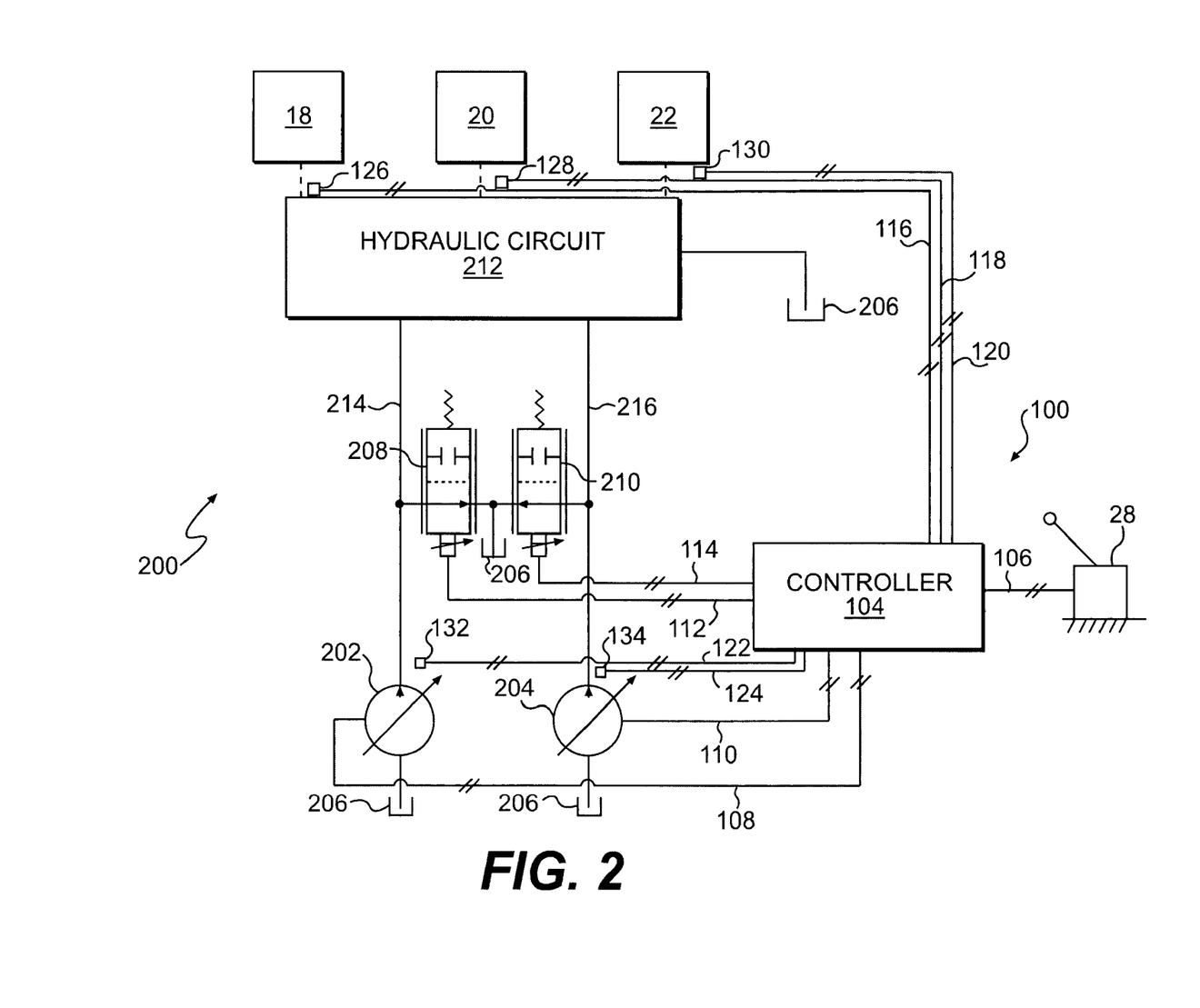
FIG. 2 is a schematic illustration of an exemplary hydraulic system of the work machine of FIG. 1.

As illustrated in FIG. 2, work machine 10 may further include a hydraulic system 200 configured to affect the operation of work machine 10 and, in particular, may be configured to affect movement of hydraulic actuators 18, 20, 22. Hydraulic system 200 may be controlled by a control system 100. Hydraulic system 200 may include various components that cooperate to affect the operation of one or more components of work machine 10. Specifically, hydraulic system 200 may be configured to manipulate the pressure and/or flow of a pressurized fluid to affect movement of hydraulic actuators 18, 20, 22 and, as a result, affect movement of, for example, work implement 14 and/or frame 12.

Hydraulic system 200 may include first and second sources 202, 204 of pressurized fluid, a low pressure source 206, and first and second bypass valves 208, 210 fluidly connected to one or more of hydraulic actuators 18, 20, 22 via a hydraulic circuit 212. Hydraulic system 200 may be configured to control the direction and/or pressure of pressurized fluid to and from one or more chambers of hydraulic actuators 18, 20, 22. Specifically, hydraulic system 200 may be configured to selectively direct a flow of pressurized fluid from first and second sources 202, 204 to hydraulic actuators 18, 20, 22 and selectively direct the flow of pressurized fluid from hydraulic actuators 18, 20, 22 to low pressure source 206 via hydraulic circuit 212 to selectively affect movement of one or more of hydraulic actuators 18, 20, 22. It is contemplated that hydraulic system 200 may include additional and/or different components such as, for example, pressure relief valves, pressure make-up valves, check valves, temperature sensors, filters, position sensors, restrictive orifices, accumulators, and/or other components known in the art.

First and second sources 202, 204 may be configured to produce a flow of pressurized fluid and may include a variable displacement pump such as, for example, a swash plate pump, a variable pitch propeller pump, and/or other sources of pressurized fluid known in the art. First and second sources 202, 204 may be drivably connected to a power source by, for example, a countershaft, a belt, an electrical circuit, or in any other suitable manner. First and second sources 202, 204 may be disposed upstream of low pressure source 206 and may supply pressurized fluid to first and second bypass valves 208, 210 and hydraulic circuit 212 via first and second supply passageways 214, 216. It is contemplated that hydraulic system 200 may include any number of sources of pressurized fluid, such as, for example, a single source or three or more sources.

Low pressure source 206 may include, for example, a reservoir or a tank, configured to hold a supply of fluid. The fluid may include any fluid known in the art such as, for example, a dedicated hydraulic oil. One or more hydraulic systems within work machine 10 may draw fluid from and return fluid to low pressure source 206. It is contemplated that hydraulic system 200 may be connected to multiple separate low pressure sources.

First and second bypass valves 208, 210 may each be configured to regulate a flow of pressurized fluid to low pressure source 206. First bypass valve 208 may be disposed downstream of first source 202 and second bypass valve 210 may be disposed downstream of second source 204. First and second bypass valves 208, 210 may each include a spring biased valve stem supported in a valve bore. The valve stem may be solenoid actuated and configured to proportionally move between a first position at which a maximum fluid flow may be allowed to flow to low pressure source 206 and a second position at which fluid flow may be substantially blocked from flowing to low pressure source 206. Proportional movement of the valve stem between the first position and the second position may allow a varying flow of pressurized fluid to flow to low pressure source 206. It is contemplated that the proportional valve stem may vary the flow of pressurized fluid in any manner known in the art, such as, for example, non-linearly or linearly. It is also contemplated that first and second bypass valves 208, 210 may alternatively be hydraulically actuated, mechanically actuated, pneumatically actuated, or actuated in any other suitable manner. It is also contemplated that first and second bypass valves may alternatively be spring biased to a position at which a flow of pressurized fluid is substantially blocked from flowing to low pressure source 206. It is further contemplated that the quantity of bypass valves may be equal to the quantity of sources of pressurized fluid. It is noted that the amount of the flow of pressurized fluid directed to low pressure source 206 by first and second bypass valves 208, 210 may functionally reduce the pressure supplied to hydraulic circuit 212 by first and second sources 202, 204.

Hydraulic circuit 212 may include one or more valves and/or fluid passageways configured to selectively communicate pressurized fluid from first and second supply passageways 214, 216 to hydraulic actuators 18, 20, 22 and selectively communicate pressurized fluid from hydraulic actuators 18, 20, 22 to low pressure source 206. For clarification purposes, a detailed description of the components of hydraulic circuit 212 is omitted, however, it is appreciated that hydraulic circuit 212 may embody any configuration of hydraulic components to supply fluid to and drain fluid from hydraulic actuators 18, 20, 22. It is contemplated that hydraulic circuit 212 may be capable of supplying pressurized fluid to multiple hydraulic actuators simultaneously, supplying pressurized fluid to one or more selected hydraulic actuators, and/or supplying pressurized fluid to hydraulic actuators in any manner known in the art.

Control system 100 may include various components that cooperate to affect the operation of hydraulic system 200. Specifically, control system 100 may be configured to receive operator inputs via operator interface devices 28 and operate one or more components of hydraulic system 200 in response thereto. Specifically, control system 100 may include a controller 104 and pressure sensors 126, 128, 130, 132, 134 and may be configured to control first and second bypass valves 208, 210 and first and second sources 202, 204.

Controller 104 may include one or more microprocessors configured to control the operation of hydraulic system 200. Controller 104 may include a memory, a data storage device, a communications hub, and/or other components known in the art. It is contemplated that controller 104 may be configured as a separate controller or be integrated within a general work machine control system capable of controlling various additional functions of work machine 10. Controller 104 may be configured to receive inputs from operator interface device 28 via communication line 106 and receive signals indicative of a pressure of pressurized fluid within portions of hydraulic system 200 from pressure sensors 126, 128, 130, 132, 134 via communication lines 116, 118, 120, 122, 124, respectively. Controller 104 may also be configured to access one or more relational databases, such as, for example, maps, equations, and/or look-up tables. Controller 104 may command first and second sources 202, 204 of pressurized fluid and first and second bypass valves 208, 210 based on the received inputs and the accessed databases. For example, controller 104 may issue commands, via communication lines 112, 114 to actuate first and second bypass valves 208, 210 and may also issue commands, via communication lines 108, 110 to operate first and second sources 202, 204. It is contemplated that controller 104 may also issue commands to control hydraulic circuit 212 and/or components thereof.

Pressure sensors 126, 128, 130, 132, 134 may include any known pressure sensor and may be configured to sense the pressure indicative of the pressurized fluid within portions of hydraulic system 200. Specifically, pressure sensors 126, 128, 130 may each be disposed upstream of respective hydraulic actuators 18, 20, 22 and may each be configured to communicate a signal indicative of a pressure of the pressurized fluid supplied to a respective hydraulic actuator 18, 20, 22 from hydraulic circuit 212. As such, because an external load acting on hydraulic actuators 18, 20, 22 may functionally establish a pressure of the pressurized fluid supplied thereto, pressure sensors 126, 128, 130 may be configured to communicate a signal indicative of a load pressure of hydraulic actuators 18, 20, 22 to controller 104. Additionally, pressure sensors 132, 134 may each be disposed downstream of a respective first and second source 202, 204 and may each be configured to communicate a signal indicative of the pressure established by a respective one of first and second sources 202, 204. It is contemplated that control system 100 may include any number of pressure sensors configured to sense the pressure of fluid supplied to hydraulic actuators 18, 20, 22. It is also contemplated that hydraulic system 100 may include at least two pressure sensors per hydraulic actuator, e.g., a pressure sensor disposed downstream of each of two supply valves, each supply valve configured to selectively supply fluid to one of a head-end or rod-end chamber within a hydraulic actuator.

Figure 3:
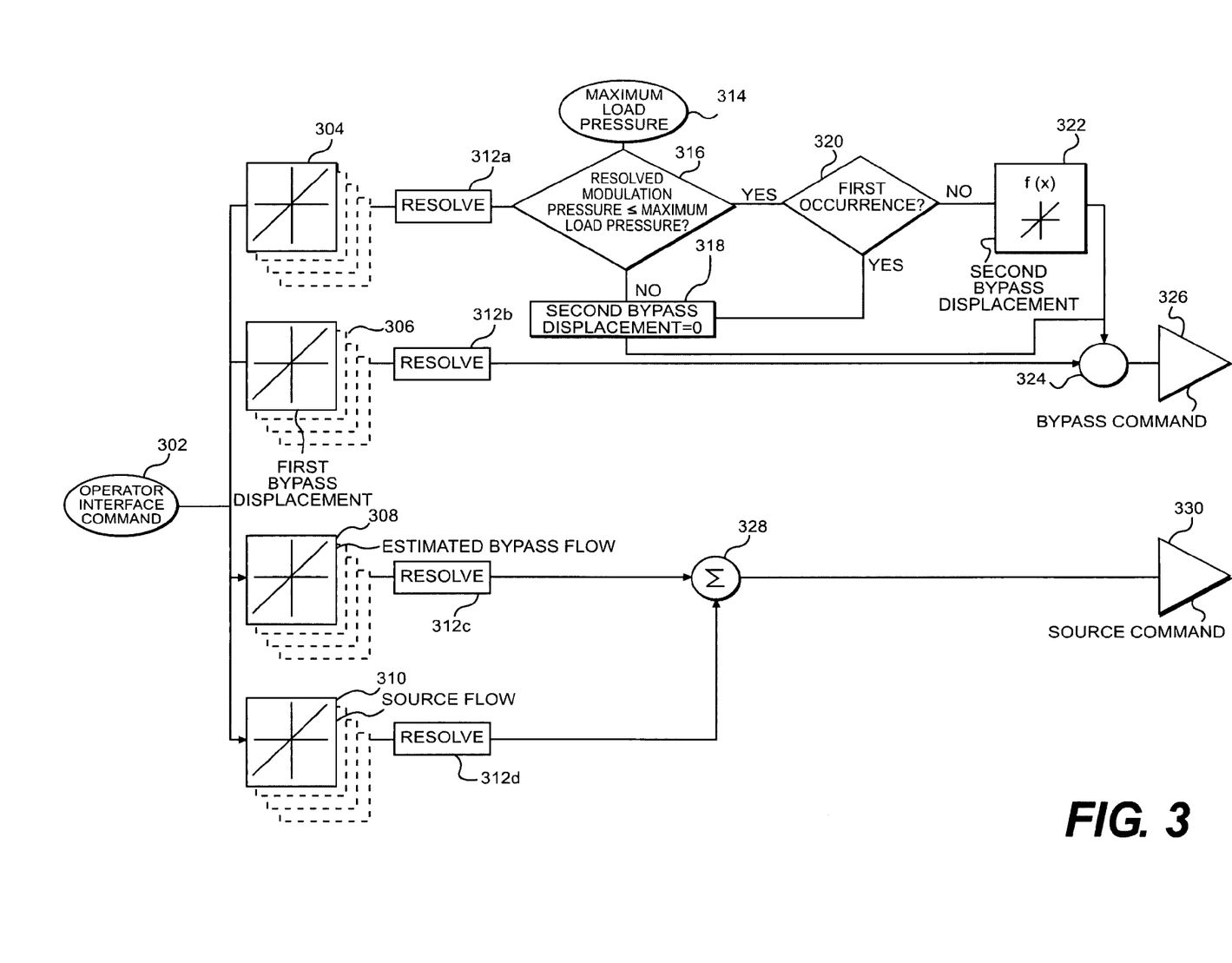
FIG. 3 is a schematic illustration of an exemplary algorithm for the bypass valves of the hydraulic system of FIG. 2.

FIG. 3 illustrates an exemplary algorithm 300 for controlling first and second bypass valves 208, 210. For clarification purposes only, algorithm 300 will be explained below with reference to first source 202, first bypass valve 208, and hydraulic actuators 18, 20, 22. It is noted, however, that algorithm 300 is applicable to second source 204 and second bypass valve 210. It is contemplated that algorithm 300 may be periodically repeated by controller 104, as desired, so as to periodically monitor the operating conditions of hydraulic system 200, operator inputs, and/or external loads acting on hydraulic actuators 18, 20, 22. For example, algorithm 300 may be repeated continuously, at a particular frequency, and/or at non-uniform or individual intervals.

Algorithm 300 may be configured to receive input signals from operator interface device 28 and pressure sensors 126, 128, 130, 132, 134 and may further be configured to determine output signals to control first bypass valve 208 and first source 202. Algorithm 300 may be configured to receive an operator interface device command 302 and access relational databases 304, 306, 308, 310 and perform one or more decisions and/or steps 316, 318, 320, 322 to determine a bypass command 326 and a source command 330. It is noted that the diagrammatic representations of relational databases 304, 306, 308, 310, and step 322 in FIG. 3 are for illustrative purposes only and actual relationships represented thereby may be in the form of any function, curve, table, map, equation, and/or other relationship known in the art.

Operator interface command 302 may include a signal configured to be indicative of a position of operator interface device 28. Operator interface command 302 may embody any signal, such as, for example, a pulse, a voltage level, a magnetic field, a sound or light wave, and/or other signal format known in the art. It is contemplated that operator interface command 302 may be directly or indirectly indicative of a position of an operator interface device 28, such as, for example, being indicative of a lever position, being indicative of a pressure of fluid operating pilot valves in a secondary hydraulic circuit, and/or being indicative of any other secondary command or indicator representative of a position of an operator interface device. It is also contemplated that operator interface command 302 may include a combination of component commands and/or indicators. It is further contemplated that operator interface command may be indicative of a position of a plurality of operator interface devices.

Relational databases 304, 306, 308, 310 may each include one or more relational maps that may be in the form of, for example, a two- or three-dimensional look-up table and/or an equation. Specifically, relational databases 304, 306, 308, 310, may include a look-up table relating operator interface positions to predetermined parameters. It is contemplated that interpolation and/or an equation may be used to relate received operator interface signals and operator interface signals within the look-up tables. It is further contemplated that relational databases 304, 306, 308, 310 may be populated with data determined from test equipment, data from predetermined relationships, data selected or desired by one or more operators, and/or data determined by any other suitable manner.

Relational database 304 may relate operator interface commands with modulation pressure. Modulation pressure may represent a pressure limit desired for given operation, below which the pressure of pressurized fluid within hydraulic system 200 may be controlled. For example, by establishing a maximum pressure for hydraulic system 200, movement of hydraulic actuator 18 may be limited as a function of a given position of operator interface device 28 because a load acting on hydraulic actuator 18 may result in a load pressure that exceeds the pressure limit desired for a given operation, e.g., first bypass valve 208 may be commanded to a position which limits the pressure of pressurized fluid supplied by first source 202 to a pressure lower than a pressure necessary to move hydraulic actuator 18. As such, an operator may need to reposition operator interface device 28 to increase the pressure output of first source 202 and/or to increase the pressure limit to thereby affect movement of hydraulic actuator 18 against the encountered resistance, e.g., an operator may need to further actuate operator interface device 28. It is contemplated that relational database 304 may include a plurality of databases which correspond to a plurality of operator interface commands 302, which may thereby establish a plurality of modulation pressures for each of the plurality of operator interface commands 302.

Relational database 306 may be configured to functionally relate operator interface positions to predetermined first bypass displacements. Specifically, relational database 306 may relate operator interface positions to predetermined first bypass displacements to establish an initial amount of flow area through which pressurized fluid may flow. The initial amount of flow area may correspond to an approximate amount of load feedback that is desired to be provided to an operator. For example, a particular operator interface command 302 may establish an initial flow area of first bypass valve 208 which may direct an initial amount of pressurized fluid to low pressure source 206 to provide a desired feedback to an operator, e.g., provide a feedback indicative of the load acting on actuator 18. It is contemplated that relational database 306 may include a plurality of databases which correspond to a plurality of operator interface commands 302, which may thereby establish a plurality of first bypass displacements for each of the plurality of operator interface commands 302.

Relational database 308 may relate operator interface positions to predetermined estimated bypass flows. For example, a particular operator interface command 302 may establish an estimated bypass flow based in part on the determined first bypass displacement and/or modulation pressure and the estimated flow of pressurized fluid therethrough. It is contemplated that relational database 308 may include a plurality of databases which correspond to a plurality of operator interface commands 302, which may thereby establish a plurality of first bypass displacements. It is also contemplated that relational database 308 may alternatively include a look-up table relating bypass displacements to estimated bypass flows for each of the plurality of operator interface commands 302. It is further contemplated that an estimated bypass flow may alternatively be determined as a function of a bypass command 326 and a source pressure via a relational database or an equation.

Relational database 310 may relate operator interface positions to predetermined source flows. For example, a particular operator interface command 302 may establish a source flow based in part on the desired flow or amount of pressurized fluid required to operate one or more of hydraulic actuators 18, 20, 22.

Algorithm 300 may resolve (step 312a) the one or more modulation pressures determined within relational database 304. Specifically, algorithm 300 may compare the one or more determined modulation pressures and may select one thereof for further manipulation. For example, algorithm 300 may resolve the one or more modulation pressures by selecting the maximum modulation pressure thereof, so as to establish the highest pressure limit within hydraulic system 200 when more than one operation is desired by an operator. It is contemplated that algorithm 300 may alternatively resolve the one or more modulation pressures in an known format, such as, for example, by adding or averaging. Similarly, algorithm 300 may resolve (steps 312b-d) the one or more first bypass displacements, estimated bypass flows, and/or source flows, respectively.

Maximum load pressure 314 may include a pressure indicative of the maximum load opposing movement of one of hydraulic actuators 18, 20, 22. Specifically, controller 104 may be configured to establish maximum load pressure 314 as a function of the received signals from pressure sensors 126, 128, 130. For example, controller 104 may determine maximum load pressure 314 by comparing the received signals from pressure sensors 126, 128, 130 and selecting the maximum one thereof. As such, maximum load pressure 314 may include a signal configured to be indicative of a maximum pressure of pressurized fluid supplied to hydraulic actuators 18, 20, 22. Maximum load pressure 314 may embody any signal, such as, for example, a pulse, a voltage level, a magnetic field, a sound or light wave, and/or other signal format known in the art.

Decision 316 may include determining if the resolved modulation pressure, e.g., the modulation pressure determined from relational database 304 and resolved in step 312a, is less than or equal to maximum load pressure 314. If so, algorithm 300 may progress to decision 320. If the resolved modulation pressure is not less than or equal to the maximum load pressure, e.g., the resolved modulation pressure is greater than the maximum load pressure, algorithm 300 may progress to relation 318. As such, decision 316 may establish no effects of the resolved pressure modulation on bypass command 326 for load pressures within hydraulic system 200 that are greater than an operator determined maximum pressure. As such, decision 316 may allow movement of one of hydraulic actuators 18, 20, 22 without modifying a resolved first bypass displacement. For example, an operator may not want to limit the movement of first hydraulic actuator 18 when operator interface device 28 may be significantly displaced and small resistive forces act on hydraulic actuator 18, e.g., an operator fully actuates operator interface device 28 to move hydraulic actuator 18 through soft soil. By not modifying a resolved first bypass displacement, first bypass valve 208 may be controlled to direct less flow of pressurized fluid to low pressure source 206 and more flow of pressurized fluid may be directed to hydraulic actuator 18. As such, hydraulic system 200 may more efficiently cause movement of hydraulic actuator 18 when accurate operator feedback may not be desired and an operator desires more actuation force than necessary to affect movement of one of hydraulic actuators 18, 20, 22.

Decision 320 may determine if the occurrence of the resolved modulation pressure being less than or equal to the maximum load pressure is the first occurrence. If so, algorithm 300 may progress to relation 318. If not so, algorithm 300 may progress to step 322. As such, decision 320 may enable controller 104 to control hydraulic system 200 to allow a pressure build-up upon initiation of movement of one of hydraulic actuators 18, 20, 22. Specifically, first source 202 may require a time delay to supply pressurized fluid to hydraulic system 200 to establish the desired pressure corresponding to the relative position of operator interface device 28. It is noted that the required time delay may be a result of source 202 supplying a flow of pressurized fluid to hydraulic system 200 against a load acting on one of hydraulic actuators 18, 20, 22 until the supply of fluid is sufficient to establish the desired pressure.

Step 322 may functionally relate modulation pressures and second bypass displacements and may include an equation, a relational database, and/or a combination thereof. Specifically, step 322 may relate a source pressure, a margin pressure, and the resolved modulation pressure to establish a non-zero second bypass displacement. For example, a relational database may relate a control pressure equal to the pressure downstream of first source 202 minus the modulation pressure and minus a margin pressure with second bypass displacements. It is contemplated that pressure sensor 132 may communicate a signal indicative of the pressure downstream of first source 202 and that the margin pressure may be equal to the pressure loss associated with hydraulic circuit 212. It is further contemplated that the second bypass displacement may alternatively be determined as a function of the operator interface command 302 by, for example, a look-up table relating operator interface commands 302 and second bypass displacements. It is noted that the second bypass displacement may modify the first bypass displacement to affect a smaller bypass displacement, e.g., the second bypass displacement may modify the first bypass displacement thereby increasing the area of first bypass valve 208 above an area established by the first bypass displacement.

Relation 318 may determine a second bypass displacement to be zero. As such, if the resolved modulation pressure is greater than the maximum load pressure (decision 316) or it is the first occurrence of the resolved modulation pressure being less than or equal to the maximum load pressure (decision 320), relation 318 may establish the second bypass displacement to zero. As such, the determined first bypass displacement may not be reduced.

Algorithm 300 may resolve (step 324) the first and second bypass displacements for a given operator interface command 302. The determined first and second bypass displacements may be resolved by, for example, selecting the one of the determined first and second bypass displacements that would affect a larger flow area of first bypass valve 208, e.g., would affect a smaller displacement of first bypass valve 208. Alternatively, algorithm 300 may functionally modify, e.g., combine, add, subtract, average, multiply, discount, or otherwise modify the first bypass displacement as a function of the second bypass displacement to establish a single displacement. Algorithm 300 may establish a bypass command 326 as a function of the resolved first and second displacements. It is noted that if the second bypass displacement is a non-zero value, e.g., algorithm 300 progressed to step 322, algorithm 300 may, in step 324, establish a bypass command 326 to control first bypass valve 208 to direct more flow to low pressure source 206 than algorithm 300 may establish if the second bypass displacement is a zero value.

Algorithm 300 may combine (step 328) the determined estimated bypass flow and the determined source flow for a given operator interface command 302. The determined estimated bypass flow and the determined source flow may be combined by adding the respective flows into a single flow. Algorithm 300 may establish a flow command 330 as a function of the combined determined bypass and source flows. Combining the estimated bypass flow and the source flow may provide an appropriate amount of pressurized fluid to hydraulic system 200 to satisfy an actuator requirement.

Bypass command 326 may include a signal configured to energize the solenoid associated with bypass valve 208 to move the valve stem of bypass valve 208 relative to the valve bore of bypass valve 208 to vary the flow area thereof. Bypass command 326 may embody any signal, such as, for example, a pulse, a voltage level, a magnetic field, a sound or light wave, and/or other signal format known in the art.

Source command 330 may include a signal configured to actuate source 202 to move components thereof to vary the flow rate and/or pressure of source 202. Source command 330 may embody any signal, such as, for example, a pulse, a voltage level, a magnetic field, a sound or light wave, and/or other signal format known in the art.

It is contemplated that controller 104 may additionally be configured to compare the signals received from pressure sensors 132, 134 with the resolved pressure modulation. As such, controller 104 may additionally control the pressure output of first and second sources 202, 204 to be less than the determined modulation pressure. It is further contemplated that algorithm 300 may selectively enable the effects of decision 316 as desired, so as to selectively enable reduction of the first bypass displacement with a non-zero second bypass displacement. As such, algorithm 300 may be configured to selectively increase the controllability of operator feedback indicative of a load acting on one of hydraulic actuators 18, 20, 22 as desired.

INDUSTRIAL APPLICABILITY

The disclosed hydraulic system may be applicable to any work machine that includes a hydraulic actuator. The disclosed hydraulic system may provide accurate operator feedback indicative of a load acting on a hydraulic actuator, may be applicable to multi-source systems, and/or may provide a simple bypass control configuration. The operation of hydraulic system 200 is explained below.

Referencing FIG. 2, first and second sources 202, 204 may receive fluid from low pressure source 206 and supply pressurized fluid to first and second fluid passageways 214, 216, respectively. As such, pressurized fluid may be supplied to upstream sides of first and second bypass valves 208, 210 and to hydraulic circuit 212. Initially, first and second sources 202, 204 may supply pressurized fluid to hydraulic system 200 at a minimum pressure and flow rate. The minimum pressure and flow rate may be determined by, for example, a minimum swashplate angle of a swashplate pump. First and second bypass valves 208, 210 may each be actuated to an initial flow area at which substantially all of the minimum flow rate supplied by first and second sources 202, 204 may be directed to low pressure source 206.

One or more of hydraulic actuators 18, 20, 22 may be movable by fluid pressure in response to operator inputs. An operator may actuate operator interface device 28 to a desired position to affect control of a component of work machine 10, such as, for example, work implement 14. Operator interface device 28 may transmit an operator interface command 302 (FIG. 3) to controller 104, via communication line 106, indicative of the relative position of operator interface device 28. Controller 104 may receive operator interface command 302 for use within algorithm 300.

Referencing FIG. 3, controller 104 may be configured to execute algorithm 300 in response to operator interface command 302. Specifically, algorithm 300 may be configured to determine a modulation pressure, a first bypass displacement, an estimated bypass flow, and a source flow as a function of operator interface command 302. Algorithm 300 may determine one or more modulation pressures via relational database 304, determine one or more first bypass displacements via relational database 306, determine one or more estimated bypass flows via relational database 308, and determine one or more source flows via operational database 310. Algorithm may resolve (steps 312a-d) each of the one or more modulation pressures, first bypass displacements, estimated bypass flows, and source flows, to determine an appropriate ones thereof for subsequent manipulation. Algorithm 300 may combine the resolved estimated bypass flow and the resolved source flow (step 328) to establish source command 330.

Algorithm 300 may also receive a signal indicative of the maximum load pressure (314) from one or more of pressure sensors 126, 128, 130 and may be configured to determine a second bypass displacement as a function thereof. Algorithm 300 may compare the resolved modulation pressure with the maximum load pressure within decision 316. If the resolved modulation pressure is less than or equal to the maximum load pressure, algorithm 300 may progress to decision 320 to determine if this is the first occurrence of the resolved modulation pressure being less than or equal to maximum load pressure. If the resolved modulation pressure is not less than or equal to the maximum load pressure or if it is the first occurrence of the resolved modulation pressure being less than or equal to the maximum load pressure, algorithm 300 may establish the second bypass displacement to be zero in relation 318.

Algorithm 300 may progress to step 322 when the resolved modulation pressure is less than the maximum load pressure and it is not the first occurrence of thereof. Algorithm 300 may determine a non-zero second bypass displacement within step 322 via an equation and/or a look-up table. Algorithm 300 may then resolve the determined first and second bypass displacements (step 324) to establish bypass command 326. By determining a non-zero second bypass displacement, algorithm 300 may establish a lower pressure limit within hydraulic system 200 when the load pressure is greater than the modulation pressure.

When operator interface device 28 is moved from a neutral position, e.g., a position at which none of hydraulic actuators 18, 20, 22 are desired to be moved, to an operational position, e.g., a position at which one or more of hydraulic actuators 18, 20, 22 are desired to be moved, the pressure of hydraulic fluid within hydraulic system 200 may require a pressure build-up to reach a desired output pressure from first and second sources 202, 204. Specifically, first and second sources 202, 204 may need to supply pressurized fluid to first and second supply passageways 214, 216 for a period of time to establish a pressure of pressurized fluid within hydraulic system 200 desired to be supplied to one of hydraulic actuators 18, 20, 22 to affect a desired movement thereof. As such, algorithm 300 may, in decision 320, allow for such a build-up to occur, and thus may allow for more efficient pressure build-up within hydraulic system 200 by not diverting an additional amount of pressurized fluid via first bypass valve 208 to low pressure source 206, e.g., algorithm 300 may not reduce the first bypass displacement.

Controller 104 may be configured to communicate bypass command 326 to one of first and second bypass valves 208, 210 via communication lines 112, 114 (FIG. 2) and may be configured to communicate source command 330 to one of first and second sources 202, 204 via communication lines 108, 110 (FIG. 2). It is contemplated that algorithm 300 may be performed, as desired, to generate a bypass command for each one of first and second bypass valves 208, 210 and to generate a source command for each one of first and second sources 202, 204. It is further contemplated that algorithm 300 may, alternatively, be configured to simultaneously determine first and second bypass commands to control first and second bypass valves 208, 210, respectively, and to determine first and second source commands to control first and second sources 202, 204, respectively.

Again referencing FIG. 2, in response to a bypass command communicated from controller 104 to each of first and second bypass valves 208, 210 via communication lines 112, 114, the respective valve stems of first and second bypass valves 208, 210 may be actuated. Additionally, first and second sources 202, 204 may be operated to deliver respective flows of pressurized fluid to first and second fluid passageways 214, 216 in response to first and second source commands communicated from controller 104 via communication lines 108, 110. Furthermore, controller 104 may control the operation of hydraulic circuit 212 to selectively operate one or more of hydraulic actuators 18, 20, 22.

For example, an operator may desire extension or retraction of hydraulic actuator 18. As such, operator inputs via operator interface device 28 may, via controller 104, selectively command first and second sources 202, 204 to establish first and second flows of pressurized fluid, selectively command first and second bypass valves 208, 210 to direct first and second bypass flows of pressurized fluid to low pressure source 206, and may selectively actuate one or more valves of hydraulic circuit 212 to direct pressurized fluid to and from hydraulic actuator 18.

The first flow of pressurized fluid from first source 202 may be directed to hydraulic circuit 212 via first fluid passageway 214. A portion of the first flow of pressurized fluid may be directed to low pressure source 206 through first bypass valve 208. The amount of the first flow of pressurized fluid directed to low pressure source 206 may be a function of the amount first bypass valve 208 is open, e.g., the larger the flow area of first bypass valve 208 the greater the amount of the first flow of pressurized fluid diverted to low pressure source 206. It is contemplated that a larger flow area of first bypass valve 208 may establish a lower pressure limit for hydraulic system 200 by, for example, bypassing a greater flow of pressurized fluid from first source 202 to low pressure source 206 during a resistive movement of hydraulic actuator 18. As such, hydraulic system 200 may be limited to affecting movement of one or more of hydraulic actuators 18, 20, 22 against loads acting thereon.

In multi-function operation where, for example, more than one of hydraulic actuators 18, 20, 22 may be simultaneously actuated, multiple modulation pressures, first bypass displacements, estimated bypass flows and source flows may be determined. As such, algorithm 300 may resolve each of such parameters by, for example, selecting a maximum one of each of the determined parameters for subsequent manipulation within algorithm 300. It is contemplated that by resolving multiple modulation pressures, first bypass displacements, estimated bypass flows, and source flows by selecting the maximum parameter thereof, controller 104 may establish and communicate a bypass command that would control a respective bypass valve to the greatest displacement, e.g., controlled to the least flow area. It is contemplated that controlling first and second bypass valves 208, 210 to the greatest displacement in multi-function operations may provide a higher pressure limit within hydraulic system 200 which may be necessary to achieve the pressure desired by an operator as indicated by the position of operator interface device 28 and operator interface command 302. It is also contemplated that in single- and/or multi-function operation, first and second bypass valves 208, 210 may be controlled to any flow area between a fully opened position and a fully closed position as desired. It is also contemplated that controller 104 may selectively not reduce the first determined bypass displacement by, for example, selectively establishing the second bypass displacement to be equal to zero regardless of a relation between a resolved modulation pressure and a maximum load pressure. It is also contemplated that in multi-function operations, controller 104 may control first and second bypass valves 208, 210 in different operating modes such as, for example, controlling both first and second bypass valves 208, 210 by resolving first bypass displacements with non-zero second bypass displacements, controlling only one of first and second bypass valves 208, 210 by resolving first bypass displacements with non-zero second bypass displacements, or controlling both of first and second bypass valves 208, 210 by not resolving first bypass valve displacements with non-zero second bypass displacements.

Because algorithm 300 compares the maximum load pressure and the resolved modulation pressure, and resolves the first and second bypass displacements, algorithm 300 may be configured to selectively reduce the first bypass displacement when the modulation pressure is less than or equal to the maximum load pressure. As such, the first bypass displacement may represent an approximate bypass displacement and thus provide an approximate feedback to an operator and/or establish an approximate pressure limit for hydraulic system 200. By resolving a first bypass displacement by a non-zero second bypass displacement, algorithm 300 may establish a more accurate bypass displacement and thus provide a more accurate force feedback to an operator and/or may establish a more accurate pressure limit for hydraulic system 200.

Furthermore, by establishing the second bypass displacement to zero when modulation pressure is greater than load pressure, algorithm 300 may direct a relatively small amount of pressurized fluid to low pressure source 206 when a relatively small load acts on a hydraulic actuator and an operator desires a high pressure limit within hydraulic system 200. For example, an operator may supply pressurized fluid having a relatively large pressure to hydraulic system 200 to overcome a relatively small resistive load on hydraulic actuator 18. Because this may be a desired operation, e.g., an operator does not desire an accurate feedback of the load, algorithm 300 may control first and second bypass valves 208, 210 so as not to unnecessarily direct pressurized fluid to low pressure source 206 when an operator does not desire accurate feedback. As such, algorithm 300 may affect control of hydraulic system 200 to direct a greater flow of pressurized fluid to hydraulic actuator 18 for movement thereof.

It will be apparent to those skilled in the art that various modifications and variations can be made to the disclosed hydraulic system having area controlled bypass. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system comprising:
   a first source of pressurized fluid;
   at least one fluid actuator; and
   a first valve disposed between the first source and the at least one fluid actuator being configured to selectively communicate pressurized fluid from the first source to a source of low pressure; and
   a controller configured to:
   determine a first amount of displacement of the first valve,
   determine a second amount of displacement of the first valve, and
   modify the first amount of displacement as a function of the second amount of displacement and communicate a signal indicative of the modified first amount of displacement to the first valve to affect movement of the first valve without communicating signals indicative of the first or second amounts of displacement to the first valve when a first pressure is less than or equal to a pressure of pressurized fluid acting on the at least one fluid actuator.

2. The hydraulic system of claim 1, wherein the at least one fluid actuator is a first plurality of fluid actuators, the hydraulic system further including a first passageway fluidly communicating the first source, the first valve, and the first plurality of fluid actuators.

3. The hydraulic system of claim 1, wherein the controller is configured to receive an operator input and determine the first amount of displacement as a function of the operator input.

4. The hydraulic system of claim 1, wherein the second amount of displacement is a function of a predetermined pressure limit within the hydraulic system.

5. The hydraulic system of claim 1, wherein:
   the first amount of displacement of the first valve is determined as a function of operator inputs and predetermined amounts of displacements;
   the second amount of displacement of the first valve is determined as a function of pressures of pressurized fluid within the hydraulic system and predetermined amounts of displacements;
   the controller determines a third amount of displacement by combining the first and second amounts of displacements of the first valve; and
   the controller affects movement of the first valve to allow pressurized fluid to flow through a flow area as a function of the third amount of displacement.

6. The hydraulic system of claim 1, wherein the controller is further configured to:
   determine a plurality of first pressures and select the maximum one of the plurality of first pressures; and
   determine the second amount of displacement as a function of the maximum one of the plurality of first pressures.

7. The hydraulic system of claim 1, wherein the controller is further configured to determine the second amount of displacement to be zero if the occurrence of the first pressure being less than or equal to the pressure of pressurized fluid is the first occurrence and determining the second amount of displacement to be non-zero for all other occurrences of the first pressure being less than or equal to the pressure of pressurized fluid.

8. The hydraulic system of claim 1, wherein the at least one fluid actuator is a plurality of fluid actuators, the system further including:
   a second source of pressurized fluid; and
   a second valve disposed between the second source and the plurality of fluid actuators;
   wherein the controller is further configured to determine a first amount of displacement of the second valve and to determine a second amount of displacement of the second valve, the second amount of displacement decreasing the first amount of displacement when a second pressure is greater than or equal to the pressure acting on a selected one of the plurality of fluid actuators.

9. The hydraulic system of claim 1, further including at least one pressure sensor configured to indicate a pressure of the pressurized fluid supplied to the fluid actuator.

10. A method of operating a hydraulic system comprising:
    pressurizing a fluid via a first source;
    directing pressurized fluid toward a first valve, the first valve having a first flow passageway and a first valve stem and being configured to selectively communicate pressurized fluid from the first source to a source of low pressure;
    establishing first and second command signals respectively indicative of first and second flow areas of the first flow passageway;
    increasing the first command signal as a function of a the second command signal when a determined pressure is less than a pressure of pressurized fluid acting on a fluid actuator, and
    communicating the increased first command signal to the first valve to affect movement of the first valve stem without communicating the first or second command signals to the first valve.

11. The method of claim 10, further including:
    establishing the determined pressure as a function of operator inputs and predetermined pressures.

12. The method of claim 10, wherein the predetermined pressures are representative of desired system pressure limits.

13. The method of claim 10, wherein pressurizing a fluid includes pressurizing a first fluid to a first pressure and directing the first fluid at a first flow rate, and pressurizing a second fluid to a second pressure and directing the second fluid at a second flow rate, the method further including:
    directing the fluid having the first flow rate toward the first valve;
    directing the fluid having the second flow rate toward a second valve;
    selectively permitting at least a portion of the first fluid to flow to the low pressure source through the first valve; and
    selectively permitting at least a portion of the second fluid to flow to the low pressure source through the second valve.

14. The method of claim 10, further including:
    determining a first area of the first flow passageway as a function of an operator input;
    determining a second area of the first flow passageway as a function of a system pressure limit;
    determining a third area of the first flow passageway by resolving the first and second areas of the first flow passageway; and
    moving the first valve stem to establish the third area of the first flow passageway.

15. The method of claim 14, further including:
    determining a first area as a function of operator inputs and predetermined flow areas;
    determining a second area as a function of predetermined pressures and predetermined flow areas when the predetermined pressure is less than or equal to the pressure of the pressurized fluid acting on the fluid actuator; and
    determining the second area to be zero when the predetermined pressure is greater than the pressure of the pressurized fluid acting on the fluid actuator.

16. The method of claim 14, further including:
    determining if the predetermined pressure is less than or equal to the pressure of pressurized fluid acting on the fluid actuator is the first occurrence thereof; and
    determining the second area to be zero for the first occurrence of the predetermined pressure being less than or equal to the pressure of the pressurized fluid acting on the fluid actuator.

17. A machine comprising:
    a implement;
    a frame;
    a first hydraulic actuator configured to affect movement of the implement;
    a second hydraulic actuator configured to affect movement of at least a part of the frame; and
    a hydraulic system including:
       a low pressure source,
       first and second sources of pressurized fluid,
       a first valve configured to selectively permit a pressurized fluid flow to the low pressure source in response to a first command, and
       a second valve configured to selectively permit a pressurized fluid flow to the low pressure source in response to a second command;
       each of the first and second commands determined as a function of a desired pressure limit of the hydraulic system.

18. The machine of claim 17, further including at least one operator interface device and a controller configured to:
    receive signal indicative of an operator input from the at least one operator interface device;
    determine the first and second commands as a function of the received signal and a determined pressure; and
    communicating the first and second commands to the first and second valves to affect movement thereof;
    wherein the movement of the first and second valves establishes the desired pressure limit.

19. The machine of claim 17, further including at least one pressure sensor operatively associated with each of the first and second fluid actuators, each of the pressure sensors configured to communicate a signal indicative of a pressure of pressurized fluid acting on the associated first and second fluid actuator to the controller.

20. The machine of claim 19, wherein:
    the desired pressure limit is determined as a function of the received signal; and
    the determined pressure is indicative of a pressure of pressurized fluid supplied to one of the first and second hydraulic actuators.

21. The machine of claim 17, wherein:
    the first command displaces a valve element of the first valve to a larger flow area when the desired system pressure limit is less than or equal to a pressure of pressurized fluid acting on the first fluid actuator than when the desired system pressure limit is greater than the pressure of pressurized fluid acting on the first fluid actuator; and the second command displaces a valve element of the second valve to a larger flow area when the desired system pressure limit is less than or equal to a pressure of pressurized fluid acting on the first fluid actuator than when the desired system pressure limit is greater than the pressure of pressurized fluid acting on the second fluid actuator.

* * * * *